March 30, 1943.  A. GERMANY  2,315,414
SUCKER ROD COUPLING
Filed July 8, 1941  2 Sheets-Sheet 1
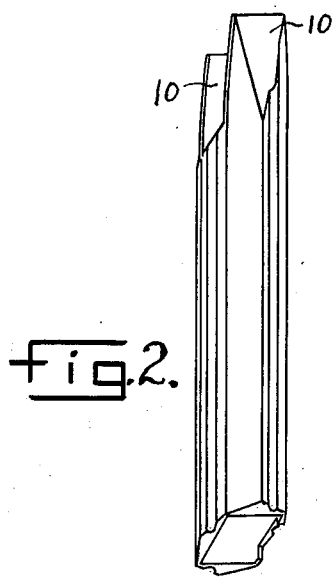
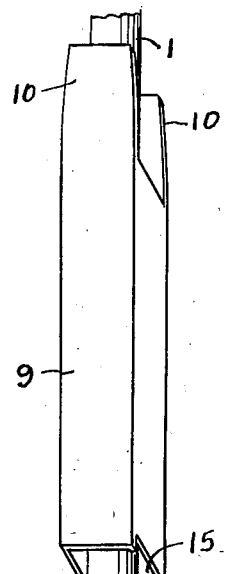
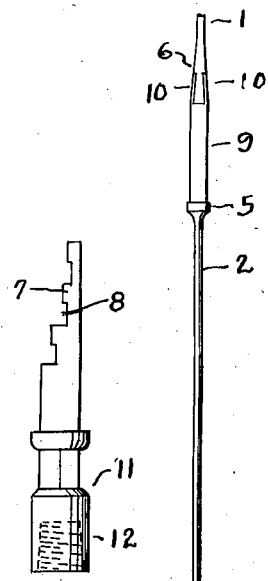
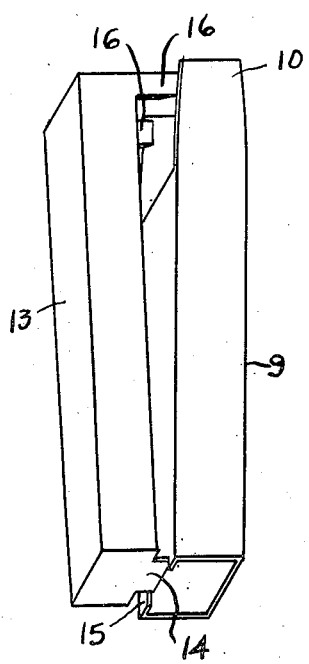
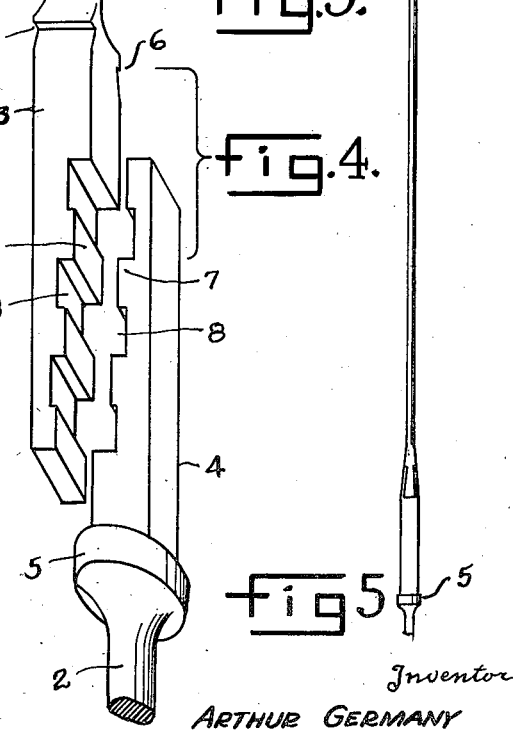
Inventor
ARTHUR GERMANY
By E. V. Hardway
Attorney March 30, 1943.    A. GERMANY    2,315,414
SUCKER ROD COUPLING
Filed July 8, 1941    2 Sheets-Sheet 2
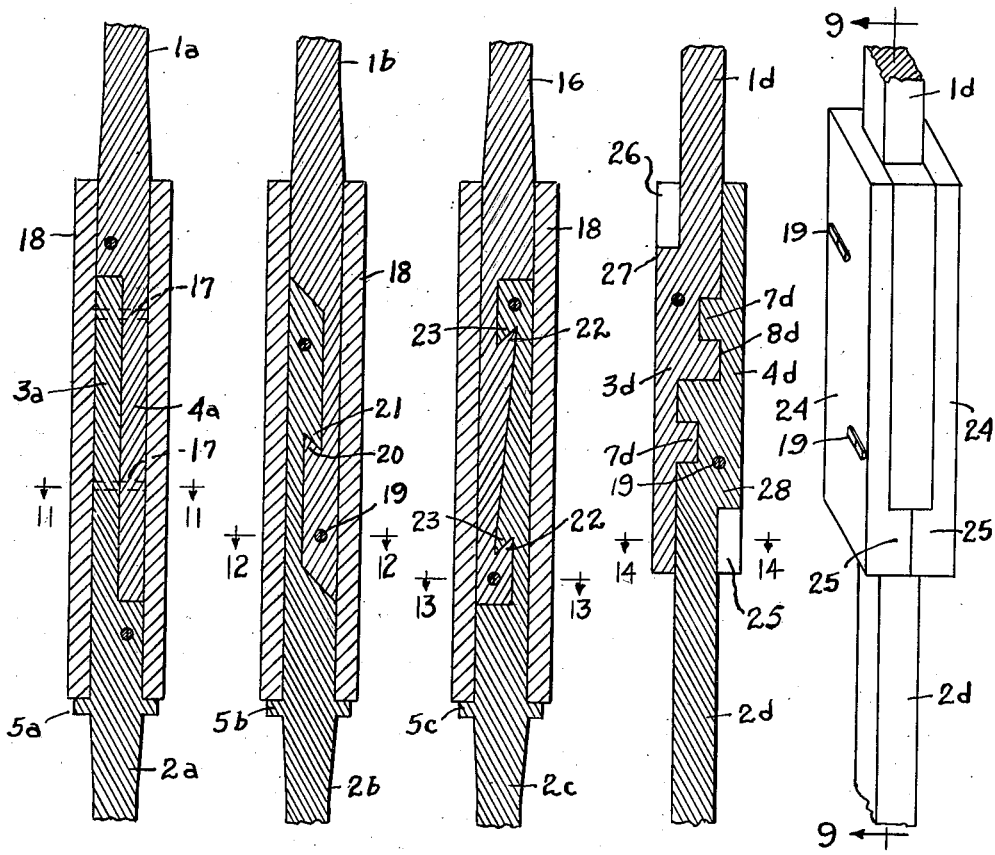
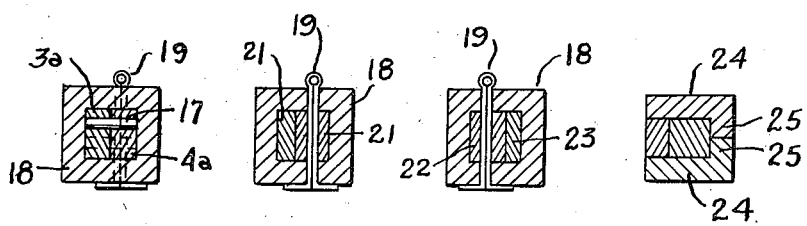
Inventor
ARTHUR GERMANY
By E. V. Hardway
Attorney Patented Mar. 30, 1943

2,315,414

UNITED STATES PATENT OFFICE 2,315,414

SUCKER ROD COUPLING

Arthur Germany, Houston, Tex.

Application July 8, 1941, Serial No. 401,405

4 Claims. (Cl. 287—104)

This invention relates to a rod coupling.

An object of the invention is to provide a coupling specially designed for connecting together sections of sucker rods used for operation of deep well pumps.

At the present time the sections of pump sucker rods are connected by threads which sometime become unscrewed permitting the sucker rod to part in the well; or sometimes the threads become worn, due to friction of the rod with the well tubing, permitting the rod to part. Also in lowering the pump into the well the sucker rod must be made up and in withdrawing the pump the sucker rod must be broken up consuming much time where the sections of the rod are screwed together.

It is one of the prime objects of the present invention to provide a coupling whereby the sections of a sucker rod may be quickly and securely united, as the sucker rod is made up and easily and quickly separated as the rod is being broken up.

A further object of the invention is to provide a rod coupling of the character described which is of simple construction, may be cheaply manufactured, which is very sturdy and wherein the connected parts are maintained against relative movement.

With the above and other objects in view the invention has particular relation to certain novel features of construction and use, examples of which are given in this specification and illustrated in the accompanying drawings, wherein:

Figure 1 shows a perspective view of a locking sleeve employed together with a tool for releasing said sleeve.

Figure 2 shows a perspective view of another type of locking sleeve employed.

Figure 3 shows a side view of the lower end section of a sucker rod.

Figure 4 shows a perspective view showing the parts of the coupling in readiness to be assembled.

Figure 5 shows a fragmentary elevational view of a sucker rod whose sections are connected together by the coupling herein described.

Figures 6 to 9 inclusive show vertical, sectional views of other embodiments of the coupling, Figure 9 being taken on the line 9—9 of Figure 10.

Figure 10 shows a perspective view of the type of coupling shown in Figure 9.

Figure 11 shows a cross-sectional view taken on the line 11—11 of Figure 6.

Figure 12 shows a cross-sectional view taken on the line 12—12 of Figure 7.

Figure 13 shows a cross-sectional view taken on the line 13—13 of Figure 8, and

Figure 14 shows a cross-sectional view taken on the line 14—14 of Figure 9.

Referring now more particularly to the drawings wherein like numerals of reference designate the same parts in each of the figures, the numerals 1 and 2 designate upper and lower sections, respectively, of a sucker rod. The adjacent ends of these sections terminate in similar pins 3, 4. At the base of the pin 4 the rod section 2 has an enlargement 5 and at the base of the pin 3 the section 1 has the opposing shoulders 6, 6.

When the coupling is assembled the pins 3, 4 will be fitted closely together, their adjacent sides being provided with similar tenons 7 and mortises 8. The tenons and mortises of one pin are staggered with respect to those of the other pin so that they will interfit. As shown the pins 3 and 4 are rectangular in cross section although they may be of any other selected shape.

On the upper section 1 there is a locking sleeve 9 which is of a shape, and of dimensions to fit snugly over the assembled pins 3, 4 with one end of the sleeve abutting the enlargement 5 as shown in Figure 5. The other end of the sleeve 9 has the inwardly curved flexible fingers 10, 10, which engage under the shoulders 6 when the sleeve 9 is moved to home position, as shown in Figure 5, so as to securely lock the coupling parts together.

Referring to Figure 3 there is shown the lower end section 11 of the sucker rod which is provided with an internally threaded box 12 to be screwed onto a corresponding pin of the pump travelling valve.

When it is desired to separate the sucker rod at a joint, a tool, specially designed for the purpose, may be applied to the locking sleeve 9. This tool comprises an elongated grip member 13 which has a lug 14, at one end engageable in a notch 15 at the corresponding end of the locking sleeve. The other end of the tool has the overturned prongs 16, 16 which are arranged to engage the inside of the fingers 10, 10 and upon a slight longitudinal movement of the tool relative to said fingers the fingers will be spread and disengaged from the shoulders 6 and the sleeve 9 may then be moved upwardly from the connected pins 3, 4 and said pins may then be readily separated.

In the form illustrated in Figure 6 the rod sections 1a, 2a have a lap joint connection, that is, they terminate in offset portions 3a, 4a which are fitted together and pinned by the cross pins 17. A sleeve 18 is then slipped over the overlapping portions until it abuts the enlargement 5 of the rod section 2a. It may be secured in place by one or more cotter keys 19 as illustrated in Figure 11.

In the form shown in Figure 7 the adjacent ends of the rod sections 1b, 2b overlap and are formed with interengaging hooks 20, 21. The hooks of the respective overlapping portions are countersunk so as to give a smooth exterior and when the overlapping portions are assembled, the sleeve 18 is slid thereover and secured in place by the cotter keys 19 as shown in Figure 12.

In the form shown in Figure 8, the sections 1c, 2c of the rod are secured together in the same manner as shown in Figure 7 excepting that the overlapping portion of each rod is provided with a plurality of hooks as 22, 22 and 23, 23, the hooks of one overlapping portion interengaging with those of the other. In this form also the sleeve 18 is fitted over said overlapping portions, when the latter are assembled, and against the enlargement or stop 5c and sleeve in this instance is also secured in place by the cotter keys 19.

In the form illustrated in Figures 9 and 10, the rod sections are indicated by the numerals 1d, 2d. The adjacent ends of the sections 1d, 2d, terminate in similar pins 3d, 4d whose contacting margins are formed with similar tenons and mortises 7d, 8d, the tenons and mortises of one pin being staggered with relation to those of the other pin so as to interfit as shown in Figure 9. When these pins are fitted together, they may be secured against detachment by means of the clamp plates 24, 24 which are fitted against the sides of the interengaging pins 3d, 4d. These clamp plates, 24 at their opposite ends, have the overturned lugs 25, 25 and 26 which engage the external shoulders 27, 28 on the respective rod sections 1d, 2d as shown in Figure 9. The locking sleeve formed by the clamp plates 24 may be secured in position by the cotter keys 19 as shown in Figure 14.

It will be noted from an inspection of Figure 4 that the pins, of this preferred form of the invention, are tapered toward their free ends so that the joint between these pins will be on the diagonal so that the pins will have the required strength at their bases where the maximum of strength is required.

The drawings and description are illustrative merely while the broad principle of the invention will be defined by the appended claims.

What I claim is:

1. A rod coupling comprising overlapping pins on adjacent ends of rod sections, a stop adjacent the base of one of said pins, shoulders adjacent the base of the other of said pins, said pins having portions which intermesh when the pins are assembled, a sleeve one end of which abuts the stop and inwardly converging releasable fingers at the other end of the sleeve engageable with said shoulders.

2. A rod coupling comprising overlapping tapering portions on adjacent ends of rod sections, interengaging means on said overlapping portions, a sleeve slidable over said overlapping portions, a stop on one rod section engageable with one end of the sleeve, a shoulder on the other section and a flexible finger on the sleeve automatically engageable underneath the shoulder to lock the sleeve assembled with said overlapping portions.

3. A rod coupling comprising overlapping pins on adjacent ends of rod sections, means for securing the pins against longitudinal movement when assembled, external stops on the rod sections, a sleeve around the assembled overlapping portions, means on the ends of the sleeve engaging said stops and including inwardly converging flexible fingers for securing the sleeve in assembled relation with the coupling.

4. A rod coupling comprising overlapping tapering pins on adjacent ends of rod sections, means on the pins adapted to interlock when the pins are assembled, a stop on one rod section, a sleeve slidable over the assembled pins into engagement with the stop, external shoulders on the other section and inwardly converging flexible fingers on the sleeve engageable with said shoulders.

ARTHUR GERMANY.